United States Patent
Engelland-Gay et al.

(10) Patent No.: US 12,087,022 B2
(45) Date of Patent: Sep. 10, 2024

(54) COMPRESSION OF DYNAMIC UNSTRUCTURED POINT CLOUDS

(71) Applicant: Magic Leap, Inc., Plantation, FL (US)

(72) Inventors: Henry Engelland-Gay, Santa Monica, CA (US); Clay Heins, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 852 days.

(21) Appl. No.: 17/058,621

(22) PCT Filed: May 29, 2019

(86) PCT No.: PCT/US2019/034430
§ 371 (c)(1),
(2) Date: Nov. 24, 2020

(87) PCT Pub. No.: WO2019/232075
PCT Pub. Date: Dec. 5, 2019

(65) Prior Publication Data
US 2021/0209808 A1     Jul. 8, 2021

Related U.S. Application Data

(60) Provisional application No. 62/679,246, filed on Jun. 1, 2018.

(51) Int. Cl.
| | |
|---|---|
| *G06K 9/00* | (2022.01) |
| *G06T 3/40* | (2006.01) |
| *G06T 7/73* | (2017.01) |
| *G06T 9/00* | (2006.01) |
| *G06T 17/20* | (2006.01) |

(52) U.S. Cl.
CPC ............ *G06T 9/001* (2013.01); *G06T 3/40* (2013.01); *G06T 7/75* (2017.01); *G06T 17/205* (2013.01)

(58) Field of Classification Search
None
See application file for complete search history.

(56) References Cited

U.S. PATENT DOCUMENTS

| | | |
|---|---|---|
| 6,850,221 B1 | 2/2005 | Tickle |
| 2006/0028436 A1 | 2/2006 | Armstrong |
| 2007/0081123 A1 | 4/2007 | Lewis |
| 2012/0127062 A1 | 5/2012 | Bar-Zeev et al. |

(Continued)

FOREIGN PATENT DOCUMENTS

| | | |
|---|---|---|
| WO | WO 2019/226865 | 11/2019 |
| WO | WO 2019/232075 | 12/2019 |

OTHER PUBLICATIONS

Lien et al., "Multi-camera tele-immersion system with real-time model driven data compression", Vis Comput (2010) 26:3-15 (Year: 2010).*

(Continued)

*Primary Examiner* — S J Park
(74) *Attorney, Agent, or Firm* — Seed IP Law Group LLP

(57) ABSTRACT

Systems and methods for compressing dynamic unstructured point clouds. A dynamic unstructured point cloud can be mapped to a skeletal system of a subject to form one or more structured point cloud representations. One or more sequences of the structured point cloud representations can be formed. The one or more sequences of structured point cloud representations can then be compressed.

23 Claims, 13 Drawing Sheets

(56) References Cited

U.S. PATENT DOCUMENTS

| | | |
|---|---|---|
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0063024 A1 | 3/2014 | Zhang et al. |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0214943 A1 | 7/2017 | Cohen et al. |
| 2017/0228896 A1 | 8/2017 | Yu et al. |
| 2017/0249401 A1 | 8/2017 | Eckart et al. |
| 2018/0144547 A1 | 5/2018 | Shakib et al. |

OTHER PUBLICATIONS

International Search Report and Written Opinion, re PCT Application No. PCT/US 19/34430, mailed Aug. 16, 2019.

International Preliminary Report for Patentability, re PCT Application No. PCT/US 19/34430, issued Dec. 1, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Lien et al., "Skeleton-Based Compression of 3-D Tele-Immersion Data," ACM/IEEE International Conference on Distributed Smart Cameras, Sep. 25-28, 2007.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

900

Volumetric Capture Data Rates

| Data Format | Approx. Data Rate (Gbps) |
|---|---|
| Raw RGB Images | 177 |
| Compressed RGB Videos | 3.1 |
| Raw Point Clouds | 1.2 |
| Compressed RGBD Video | 0.35 |

*FIG. 9*

COMPRESSION OF DYNAMIC UNSTRUCTURED POINT CLOUDS

INCORPORATION BY REFERENCE TO ANY PRIORITY APPLICATIONS

This application claims priority to U.S. Provisional Patent Application No. 62/679,246, filed Jun. 1, 2018, and entitled "COMPRESSION OF DYNAMIC UNSTRUCTURED POINT CLOUDS." Any and all applications for which a foreign or domestic priority claim is identified above and/or in the Application Data Sheet as filed with the present application are hereby incorporated by reference under 37 CFR 1.57.

BACKGROUND

Field

This disclosure relates to point clouds, such as those which may be used in image data for virtual reality, augmented reality, and mixed reality visualization systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data. Augmented reality systems generally supplement a real-world environment with simulated elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, subjects, etc. Mixed reality, or "MR," systems are a type of AR system which also introduce simulated objects into a real-world environment, but these objects typically feature a greater degree of interactivity. The simulated elements can often times be interactive in real time.

FIG. 1 depicts an example AR/MR scene 100 where a user sees a real-world park setting 110 featuring people, trees, buildings in the background, and a platform 120. In addition to these items, computer-generated image data is also presented to the user. The computer-generated image data can include, for example, a robot statue 130 standing upon the real-world platform 120, and a cartoon-like avatar character 140 flying by which seems to be a personification of a bumblebee, even though these elements 130, 140 are not actually present in the real-world environment.

SUMMARY

In some embodiments, a method comprises: mapping a dynamic unstructured point cloud to a skeletal system of a subject to form one or more structured point cloud representations; forming one or more sequences of the structured point cloud representations; and compressing the one or more sequences of structured point cloud representations.

In some embodiments, a system comprises: a hardware computing device; and a memory configured to store a dynamic unstructured point cloud and instructions which, when executed by the hardware computing device, cause the hardware computing device to perform a method comprising: mapping a dynamic unstructured point cloud to a skeletal system of a subject to form one or more structured point cloud representations; forming one or more sequences of the structured point cloud representations; and compressing the one or more sequences of structured point cloud representations.

In some embodiments, a non-transitory computer-readable medium comprises instructions which, when read by a hardware computing device, cause the hardware computing device to perform a method comprising: mapping a dynamic unstructured point cloud to a skeletal system of a subject to form one or more structured point cloud representations; forming one or more sequences of the structured point cloud representations; and compressing the one or more sequences of structured point cloud representations.

BRIEF DESCRIPTION OF THE DRAWINGS

FIG. 9 is a table which illustrates example data rates for the raw data produced by a volumetric capture system, as well as example data rates associated with different compression techniques.

DETAILED DESCRIPTION

Virtual reality (VR), augmented reality (AR) and mixed reality (MR) systems can include a display which presents computer-generated image data (e.g., still images and/or videos) to a user. In some embodiments, the display systems are wearable, which may advantageously provide a more immersive VR/AR/MR experience. The computer-generated image data provided via the display can create the impression of being three-dimensional. This can be done, for example, by presenting stereoscopic image data to the user or by projecting image data such that it appears to have originated from different apparent depth planes.

Figure 1:
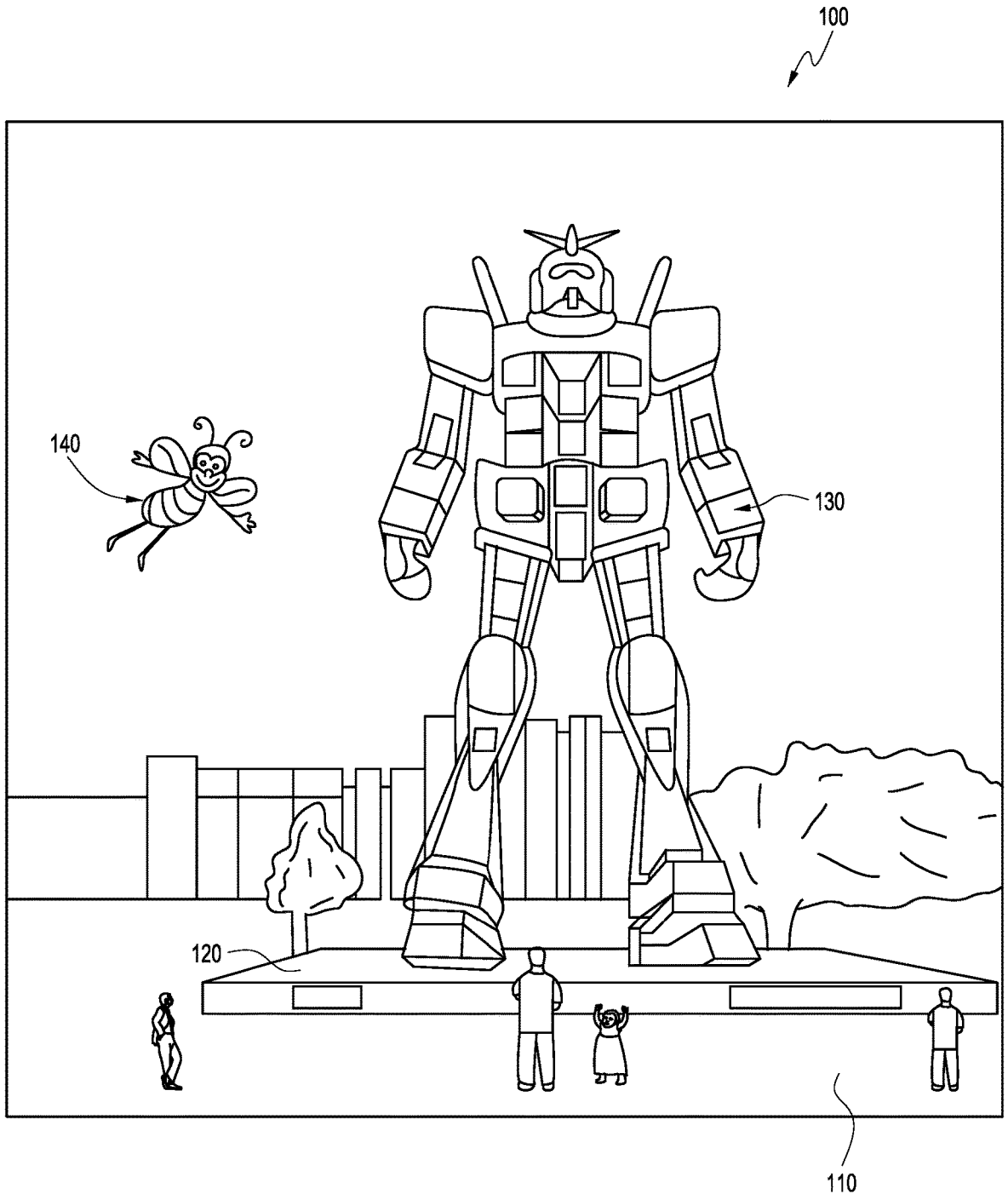
FIG. 1 illustrates a user's view of an augmented reality (AR) scene using an example AR system.
Figure 2:
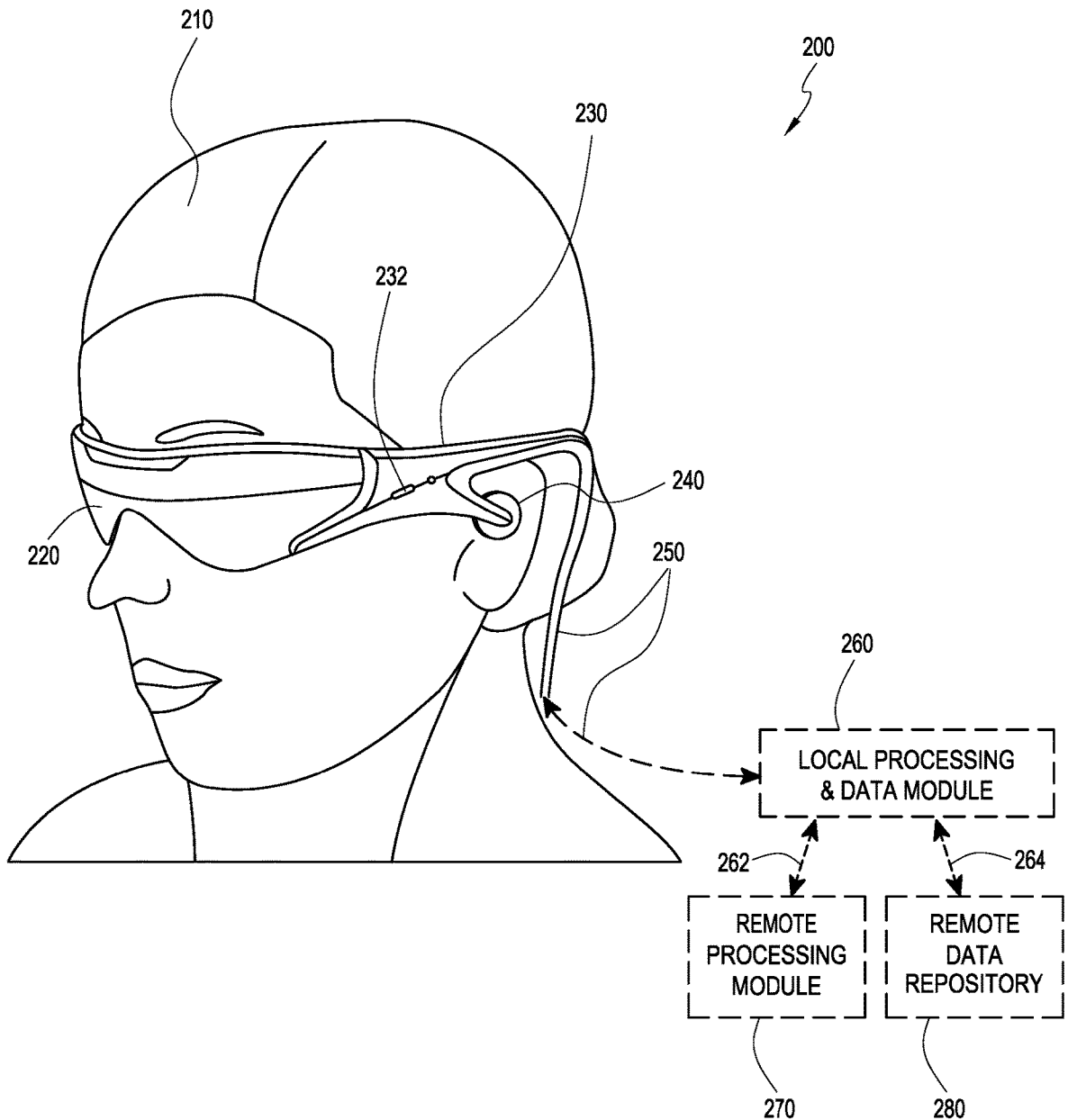
FIG. 2 illustrates an example of a wearable VR/AR/MR display system.

FIG. 2 illustrates an example of a wearable VR/AR/MR display system 200. The VR/AR/MR display system 200 includes a display 220, and various mechanical and electronic modules and systems to support the functioning of that display 220. The display 220 may be coupled to a frame 230, which is wearable by a user 210 and which positions the display 220 in front of the eyes of the user 210. A speaker 240 can be coupled to the frame 230 and positioned adjacent the ear canal of the user. Another speaker, not shown, can be positioned adjacent the other ear canal of the user to provide for stereo/shapeable sound control. The display 220 is operatively coupled, such as by a wired or wireless connection 250, to a local processing and data module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration, etc.).

The local processing and data module 260 may include a processor, as well as digital memory, such as non-volatile memory (e.g., flash memory), both of which may be utilized to assist in the processing and storing of data. This includes data captured from sensors, such as image capture devices (e.g., cameras), microphones, inertial measurement units, accelerometers, compasses, GPS units, radio devices, and/or gyros. The sensors may be operatively coupled to the frame 230 or otherwise attached to the user 210. In some embodiments, all data is stored and all computations are performed in the local processing and data module 260, allowing fully autonomous use. Alternatively, or additionally, sensor data may be acquired and/or processed using a remote processing module 270 and/or remote data repository 280. The local processing and data module 260 may be operatively coupled by communication links (262, 264), such as via a wired or wireless communication links, to the remote processing module 270 and the remote data repository 280 such that these remote modules (270, 280) are operatively coupled to each other and available as resources to the local processing and data module 260. In some embodiments, the remote processing module 270 may include one or more processors configured to analyze and process data (e.g., sensor data and/or image information). The remote data repository 280 may be a digital data storage facility, which may be available through the internet or other networking configuration in a "cloud" resource configuration.

With access to suitable image data, the VR/AR/MR system 200 is capable of displaying 360° views of a subject (e.g., a person, object, etc.) such that the user 210 can move around the subject and view it from any perspective as if it were physically present. One type of image data that can enable this functionality is a point cloud. A point cloud is a data structure for representing three-dimensional (3-D) surfaces. In particular, a point cloud includes information about the locations of spatial samples of one or more surfaces of a subject. The point cloud may also include values which indicate the brightness of the surface(s), at or near the locations of the spatial samples, in one or more color channels (e.g., red, green, and blue color channels). A point cloud can be structured or unstructured, and either static or dynamic.

A structured point cloud includes information about the locations of spatial samples of one or more surfaces of the subject as seen from a single viewpoint. A red-green-blue-depth image (i.e., an RGB-D, or simply RGBD, image) is an example representation of a structured point cloud. An RGBD image is made up of numerous pixels, each of which represents a point in the image plane of an imaging device, such as an RGBD camera, that corresponds to a point in object space within the field of view of the imaging device. In an RGBD image, each pixel is associated with red, green, and blue brightness values for the corresponding point in object space. In addition, each pixel is associated with a depth value which represents an indicator, such as a measurement, of the distance from the image plane of the imaging device to the corresponding point in object space. An RGBD camera captures information about the visible fronto-parallel surface(s) of the subject being imaged, as seen from the camera viewpoint, but generally does not capture information regarding other surfaces of the subject.

A static structured point cloud represents the locations, with respect to a single viewpoint, of spatial samples of surfaces of the subject at an instant in time. Meanwhile, a dynamic structured point cloud represents the locations, with respect to a single viewpoint, of spatial samples of surfaces of the subject at multiple instants of time. A dynamic structured point cloud representing a subject may consist of, for example, a time sequence of multiple static structured point clouds of the subject (e.g., multiple frames per second).

An unstructured point cloud includes information about the locations of spatial samples of a subject as seen from multiple viewpoints. For example, an unstructured point cloud may include 3-D coordinates of spatial samples of many, if not all, surfaces of the subject. An unstructured point cloud may also include values which indicate the surface brightness of the subject in one or more color channels (e.g., red, green, and blue color channels) at or near the locations of the spatial samples. Unstructured point clouds can be generated by, for example, 3-D scanning systems or by appropriately merging multiple structured point clouds of a subject taken from different viewpoints. This can be done using, for example, photogrammetry or Simultaneous Localization and Mapping (SLAM) algorithms.

Figure 3:
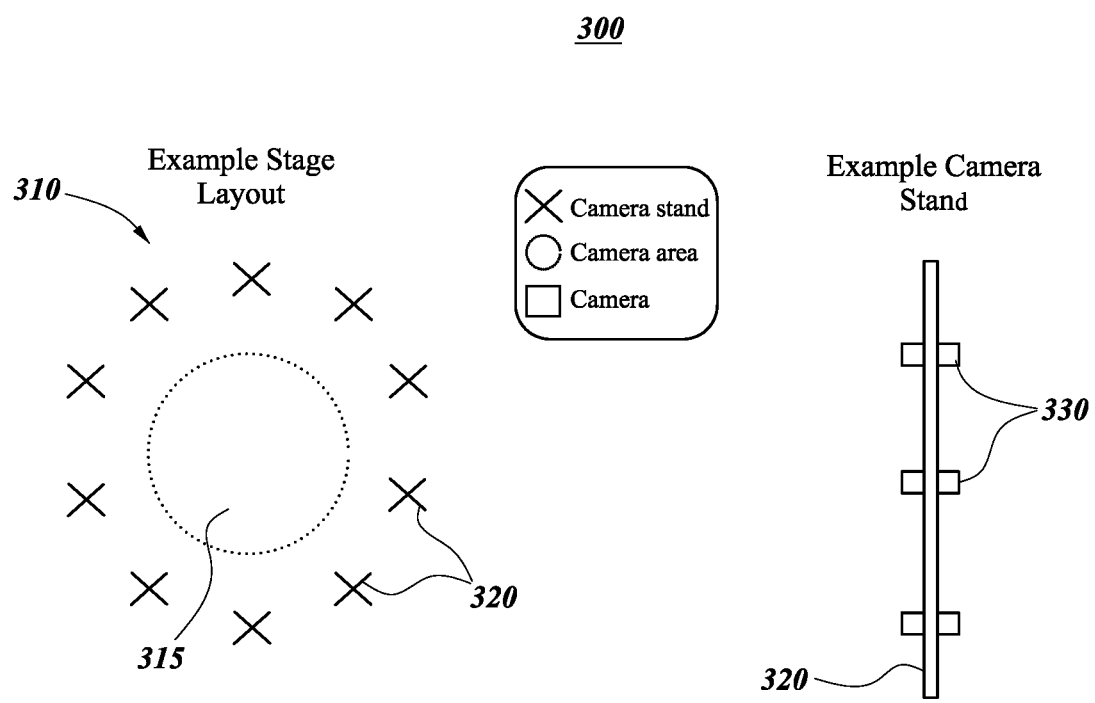
FIG. 3 is a schematic diagram which illustrates an example volumetric capture system for generating dynamic unstructured point clouds.

A static unstructured point cloud represents the locations of spatial samples of the surfaces of a subject, as seen from multiple—or possibly all—viewpoints, at an instant in time. Meanwhile, a dynamic unstructured point cloud represents the locations of spatial samples of the surfaces of the subject at multiple instants of time. A dynamic unstructured point cloud of a subject may consist of, for example, a time sequence of multiple static unstructured point clouds of that subject (e.g., multiple frames per second, or more). FIG. 3 illustrates one technique for generating dynamic unstructured point clouds of a subject.

FIG. 3 is a schematic diagram which illustrates an example volumetric capture system 300 for generating dynamic unstructured point clouds. The system 300 is located in an environment 310, which is typically a green screen room. A green screen room is a room with a capture volume 315 surrounded by green screens of the type used in chroma key compositing, which is a post-production video processing technique for compositing images or videos based on their color content.

The system 300 includes a plurality of camera stands 320 spread around the perimeter of the capture volume 315 at different locations. Each camera stand 320 can include multiple video cameras 330 mounted at different vertical heights, with the video cameras being aimed radially inward toward the capture volume 315. In this way, each of the video cameras 330 can film a subject in the capture volume 315 from a different viewpoint. In a typical embodiment of a volumetric capture system 300, the field of view of each of the video cameras 330 overlaps with those of adjacent video cameras so as to provide complete coverage of the subject being filmed in the capture area 315.

In some embodiments, the video cameras 330 are synchronized RGB video cameras. In other embodiments, the video cameras 330 are synchronized RGBD video cameras which each capture a representation of a dynamic structured point cloud of the subject in the capture volume 315. These dynamic structured point clouds, which are captured from different viewpoints, can then be mathematically combined and interpolated by a processor so as to construct a dynamic 3-D model of the subject. The 3-D model can be used to represent the subject from many, or all, viewpoints, including ones which were not actually filmed by the video cameras 330. The 3-D model can take various forms, including a polygon mesh, but a typical form of the 3-D model is a dynamic unstructured point cloud of the subject.

A dynamic unstructured point cloud can be used in the VR/AR/MR system 200 to permit the user 210 to experience the subject from many different viewpoints over time. Dynamic unstructured point clouds, such as those captured with volumetric capture techniques, offer the possibility of providing a very immersive VR/AR/MR experience. But one difficulty with volumetric capture techniques is that the raw video (e.g., RGB or RGBD video) captured by the video cameras 330, as well as the dynamic unstructured point cloud created from the raw video data, can include large amounts of data which can consume excessive amounts of computer memory and storage. There are competing interests between providing the user 210 with an immersive VR/AR/MR experience versus being able to store the large quantities of image data that may be required to provide that immersive experience. There is thus a need for compression techniques to reduce file sizes associated with dynamic unstructured point clouds.

A dynamic unstructured point cloud may exhibit both temporal and spatial redundancies. For example, some of the points in the cloud may be temporally correlated with others. In addition, the positions of some points may be inferred based on the positions of neighboring points. These temporal and spatial redundancies can be leveraged to reduce the amount of data needed to represent a dynamic unstructured point cloud (though video quality constraints may limit the amount of data compression that is possible).

Figure 4:
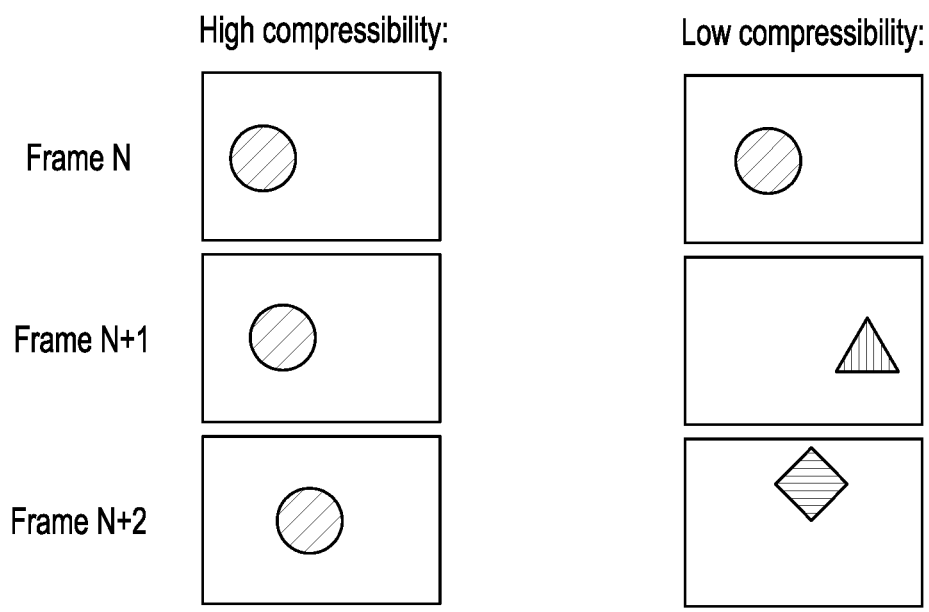
FIG. 4 is a diagram which illustrates that temporal coherency improves the compressibility of a video.

FIG. 4 is a diagram 400 which illustrates that temporal coherency improves the compressibility of a video. The diagram 400 includes two columns of video frames. The left-hand column shows three consecutive frames (beginning at frame N) of a sample video. Each of the three video frames in the left-hand column includes a common image feature—in this case, a circle—that changes position in an incremental way from one frame to the next. This temporal coherence, or consistency (i.e., small changes between frames), improves the compressibility of the sample video represented by the frames in the left-hand column. Meanwhile, the right-hand column of the diagram 400 likewise includes three consecutive frames (beginning at frame N) of a sample video. However, the frames in the right-hand column include different image features—a circle, a triangle, and a diamond, respectively—and those image features do not have any temporal coherence from one frame to the next. This lack of temporal coherence reduces the compressibility of the sample video represented by the frames in the right-hand column.

Although FIG. 4 illustrates that temporal coherency improves the compressibility of a 2-D video, the same is also true of a dynamic structured point cloud (e.g., an RGBD video). As a result, existing video compression techniques can be used to compress dynamic structured point cloud representations, as described by Nenci et al., in "Effective compression of range data streams for remote robot operations using H.264," 2014 IEEE/RSJ International Conference on Intelligent Robots and Systems; and by Coatsworth et al., in "A hybrid lossless and lossy compression scheme for streaming RGB-D data in real time," 2014 IEEE International Symposium on Safety, Security, and Rescue Robotics, each of which is hereby incorporated by reference herein in its entirety. Examples of such video compression techniques include the H.264 (MPEG-4 Part 10, Advanced Video Coding) standard, the H.265 (MPEG-H Part 2, High Efficiency Video Coding) standard, the QuickTime RLE standard, etc.

This disclosure describes an improved technique for compressing a dynamic unstructured point cloud of a subject. In some embodiments, the improved technique involves using a skeletal system model of the subject to map the unstructured point cloud into multiple structured point cloud representations, such as RGBD images. This can be done in a manner which, when applied to a temporal sequence of static unstructured point clouds (e.g., a dynamic unstructured point cloud), results in one or more sequences of structured point cloud representations (e.g., one or more RGBD videos) which are well-suited for existing video compression algorithms because they are likely to exhibit temporal coherency across local image regions. Thus, the resulting sequence(s) of structured point cloud representations can then be compressed using existing video compression techniques, such as H.264, H.265, QuickTime RLE, etc. Later, the compressed structured point cloud representations can be decoded and the RGBD sequence(s) can be used, along with a small amount of metadata, to reconstruct the original dynamic unstructured point cloud in real-time for rendering on any viewing device.

The techniques described herein are advantageous in that they enable widely-studied techniques for compressing video data, such as dynamic structured point clouds, to be applied in an improved way to the problem of compressing dynamic unstructured point clouds. The techniques shift the problem from one of inventing a new form of compression to one of mapping one data representation to another. Although the techniques described herein are well-suited for compressing dynamic unstructured point clouds (e.g., temporal sequences of static unstructured point clouds), they can also be used to compress individual static unstructured point clouds.

The techniques described herein are applicable to unstructured point clouds of any subject which can be at least partially represented using a skeletal system model. An unstructured point cloud of the subject can be mapped onto the bones of the underlying skeletal model. Each bone can be parameterized as a cylinder, which can be discretized to form a cylindrical grid of RGBD pixels (where D is the radial distance from the axis of the cylinder). Points can be assigned to bones of the skeletal system in a greedy manner—that is, points can be uniquely assigned to a single bone and then removed from consideration for other bones, and can be processed in order of increasing distance from the respective nearest bones. Each of these points can then be radially projected to a corresponding cylindrical grid of pixels to form, for example, an RGBD image. The cylindrical grid of pixels for each bone can be unwrapped and then embedded into a master image (e.g., a master RGBD image). By consistently embedding the cylindrical grid of pixels for each bone at the same location in the master image for each frame of the dynamic unstructured point cloud (e.g., left upper arm in top left of image, then left forearm, then left hand, then left fingers, etc), the resulting sequence of master images (e.g., an RGBD video) is well-suited for video compression, with strong temporal coherency in local image regions. Along with the RGBD image for each bone in the skeletal system, metadata such as the bone's length, rotation, translation, etc. can also be stored. This metadata can later be used for reconstruction of the unstructured point cloud.

Figure 5A:
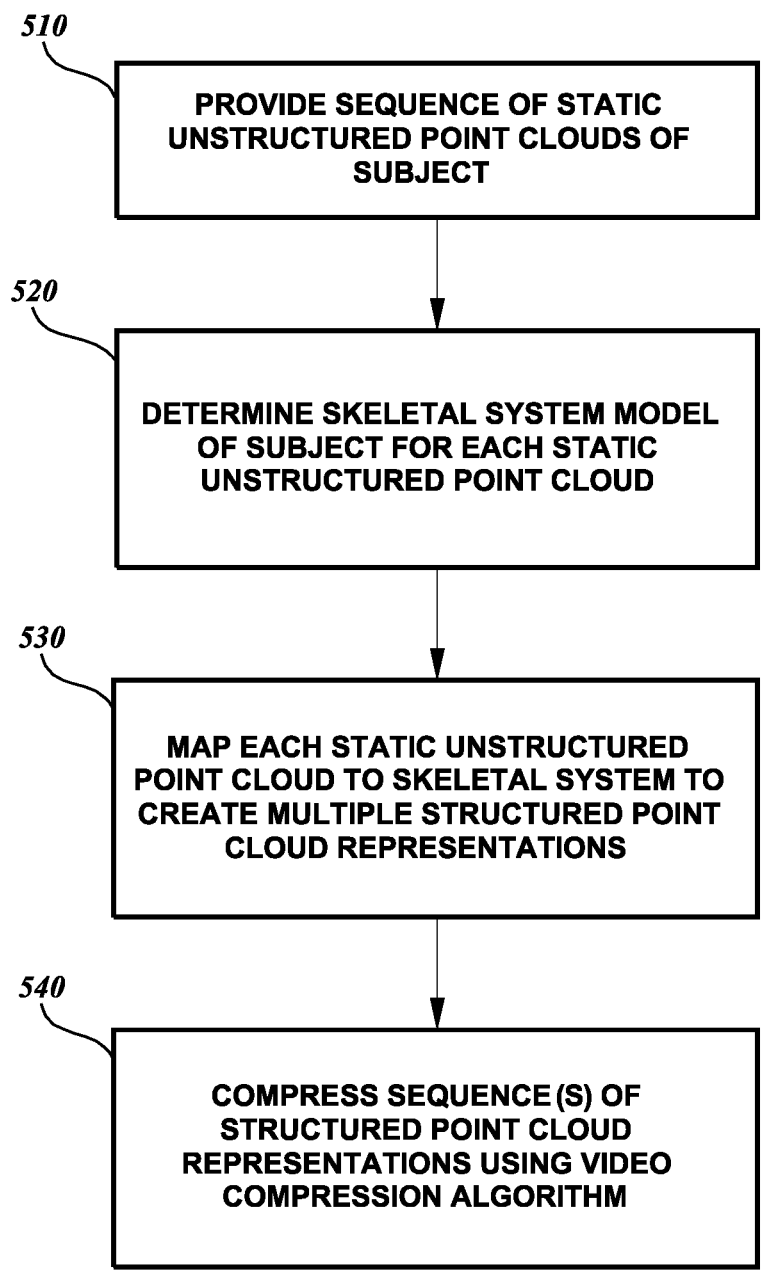
FIG. 5A is a flowchart of an example method for encoding a dynamic unstructured point cloud into a compressed format.

FIG. 5A is a flowchart of an example method 500A for encoding a dynamic unstructured point cloud into a compressed format. In some embodiments, this and other methods described herein can be carried out by a computer processor which executes programmed instructions stored in non-transitory computer memory.

The method 500A begins at block 510 where the computer processor provides, or is provided with, a dynamic unstructured point cloud of a subject. The dynamic unstructured point cloud can be made up of a sequence of static unstructured point clouds of the subject from different moments in time. The dynamic unstructured point cloud can be produced as, for example, the processed end result of the volumetric capture system 300.

At block 520, the computer processor can determine a skeletal system model of the subject for each of the static unstructured point clouds in the sequence which makes up the dynamic unstructured point cloud. By way of background, a virtual character, such as a human avatar, can be at least partially represented using a skeletal system. A skeletal system includes a collection of joints which correspond to points of articulation for the character. In this context, joints are also referred to as "bones" despite the difference between these terms when used in the anatomical sense.

The type of skeletal system used in some embodiments of the techniques described herein is a core skeleton. A core skeleton can be used to represent large-scale movements of the virtual character. In the case of a human avatar, for example, the core skeleton might resemble the anatomical skeleton of a human. Although the core skeleton may not map exactly to an anatomically-correct skeleton, it may have a sub-set of joints in analogous locations with analogous orientations and movement properties. A core skeletal system for a virtual character can have joints at appropriate positions, and with appropriate local axes of rotation, degrees of freedom, etc., to accommodate a desired set of movements by the virtual character.

As shown in block 520 of FIG. 5A, a skeletal system model of the subject can be determined for each of the frames of the dynamic unstructured point cloud that is being compressed. The skeletal system model for each frame can include a set of joints/bones, as well as their positions in three-dimensional space and their angles of orientation. Typically, the set of joints/bones for the subject will remain the same from frame to frame of the dynamic unstructured point cloud, but the positions and orientations of the joints/bones will change as the subject moves.

Figure 6A:
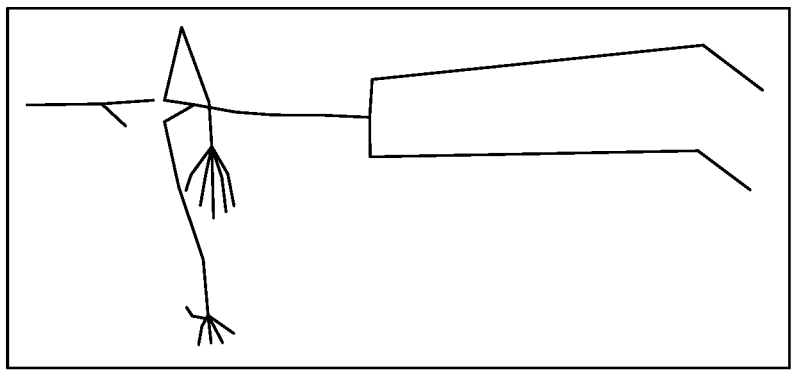
FIG. 6A illustrates an example subject of an unstructured point cloud, as well as a corresponding skeletal system.
Figure 6A:
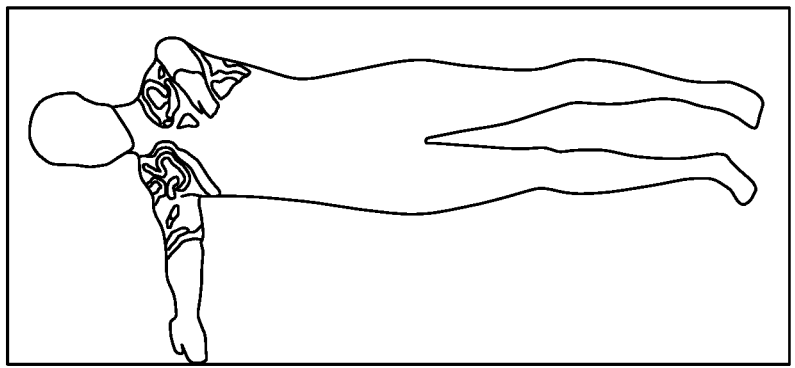

FIG. 6A illustrates an example subject 600 of an unstructured point cloud, as well as a corresponding skeletal system 610. In the illustrated embodiment, the subject 600 of the dynamic unstructured point cloud is a human avatar, shown in a base pose. FIG. 6A also shows an example skeletal system 610 for the human avatar subject 600 in the base pose. The example skeletal system 610 is made up of multiple bones, including ones which are analogous to the head, neck, spine, upper arms, lower arms, hands, fingers, upper legs, lower legs, feet, toes, etc. Each of these bones can be described by one or more values which indicate the bone's position and angle of orientation in three dimensions.

In some embodiments, the skeletal system model for each frame of the dynamic unstructured point cloud can be determined using the techniques described in U.S. Provisional Patent Application No. 62/666,321, entitled "USING THREE-DIMENSIONAL SCANS OF A PHYSICAL SUBJECT TO DETERMINE POSITIONS AND/OR ORIENTATIONS OF SKELETAL JOINTS IN THE RIGGING FOR A VIRTUAL CHARACTER," a copy of which is provided herewith as an appendix to this application and is incorporated by reference herein. However, other techniques can also be used. For example, skeletal system models can be generated from images using Openpose (available at online at github.com/CMU-Perceptual-Computing-Lab/openpose) or Wrnch (available online at wrnch.ai/), or from point clouds using Nuitrack (available online at nuitrack.com) or PointCloud Library (PCL) (available online at pointclouds.org).

With reference back to the method 500A illustrated in FIG. 5A, at block 530 each static unstructured point cloud in the sequence can be mapped to the skeletal system model for that frame. This mapping can result in multiple structured point cloud representations, such as RGBD images. This step is described further below with respect to FIG. 5B.

Then, at block 540, the computer processor can form one or more time sequences (e.g. RGBD video(s)) of the structured point cloud representations which result from block 530. This results in one or more dynamic structured point cloud representations, which can then be compressed using video compression algorithms, such as H.264, H.265, QuickTime RLE, and others.

Figure 5B:
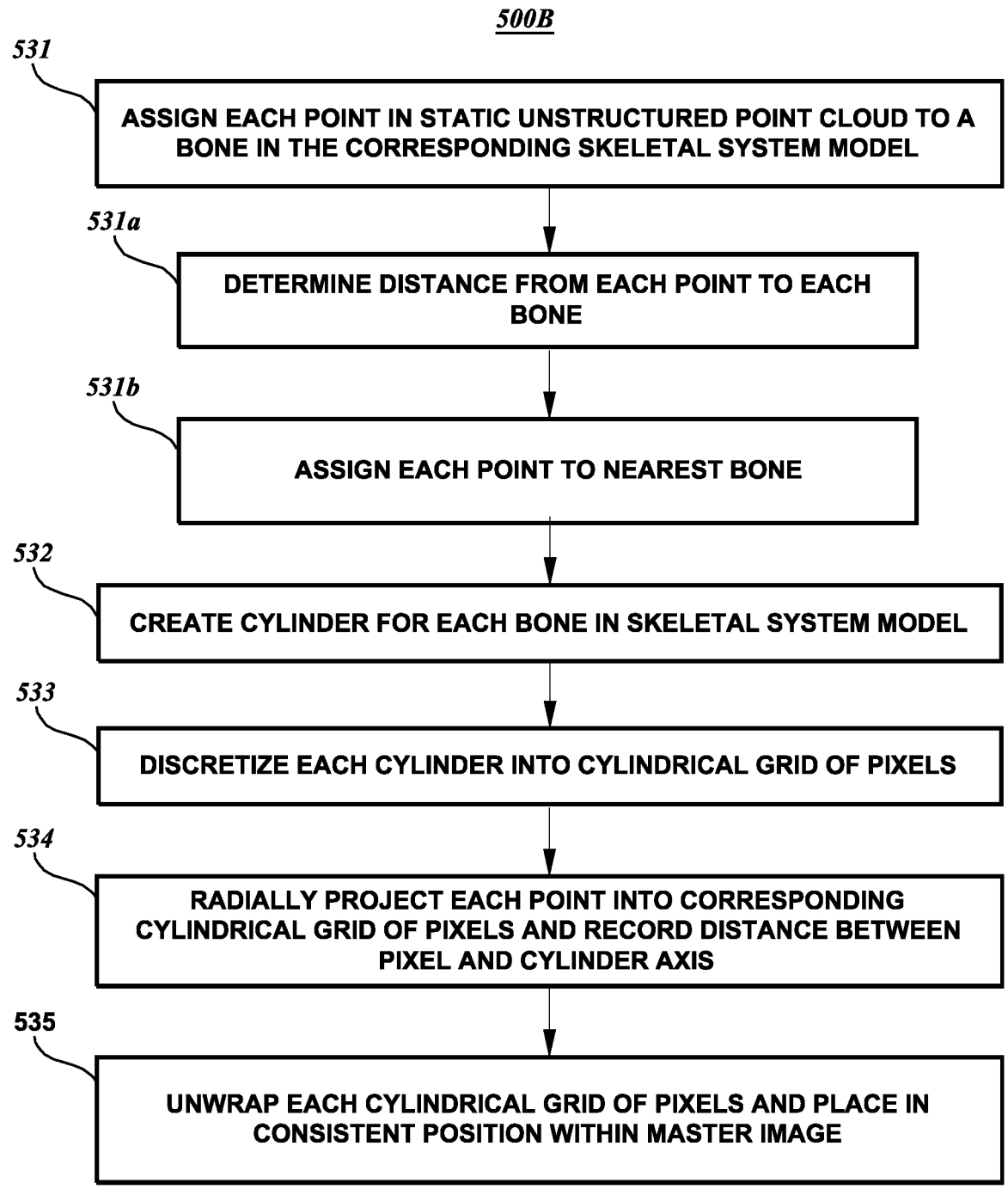
FIG. 5B is a flowchart of an example method for using a skeletal system model to map points in an unstructured point cloud into multiple structured point cloud representations.

FIG. 5B is a flowchart of an example method 500B for using a skeletal system model to map points in an unstructured point cloud into multiple structured point cloud representations. This method can be used as part of block 530 in FIG. 5A and can be repeated for each static unstructured point cloud in the dynamic unstructured point cloud that is being compressed.

The method 500B begins at block 531 where each point in a given frame of the dynamic unstructured point cloud is assigned to a bone in the skeletal system model for that frame. As shown beginning at sub-block 531a, this can be accomplished by first determining a metric of the distance from each point in the cloud to each bone in the skeletal system. In some embodiments, this metric can be the distance between a given point, in the cloud and the centroid of a given bone in the skeletal system. In other embodiments, the metric can be the distance between a given point in the cloud and the nearest point or segment of a given bone in the skeletal system. Other distance metrics can also be used. Next, at sub-block 531b, each point in the static unstructured point cloud is assigned to the bone which is nearest to it, with each point being assigned to a single bone. Using this technique, a point which may in actuality belong to one body part may, in some cases, be assigned to a bone which pertains to another body part. This can happen when, for example, body part surfaces in the unstructured point cloud touch one another (e.g., the subject's hand is resting on the hip, etc.). While this type of isolated occurrence may slightly decrease the efficiency of the compression technique described herein, it will not prevent the dynamic unstructured point cloud as a whole from being compressed, nor will it prevent the compressed dynamic unstructured point cloud from being correctly reconstructed.

Figure 6B:
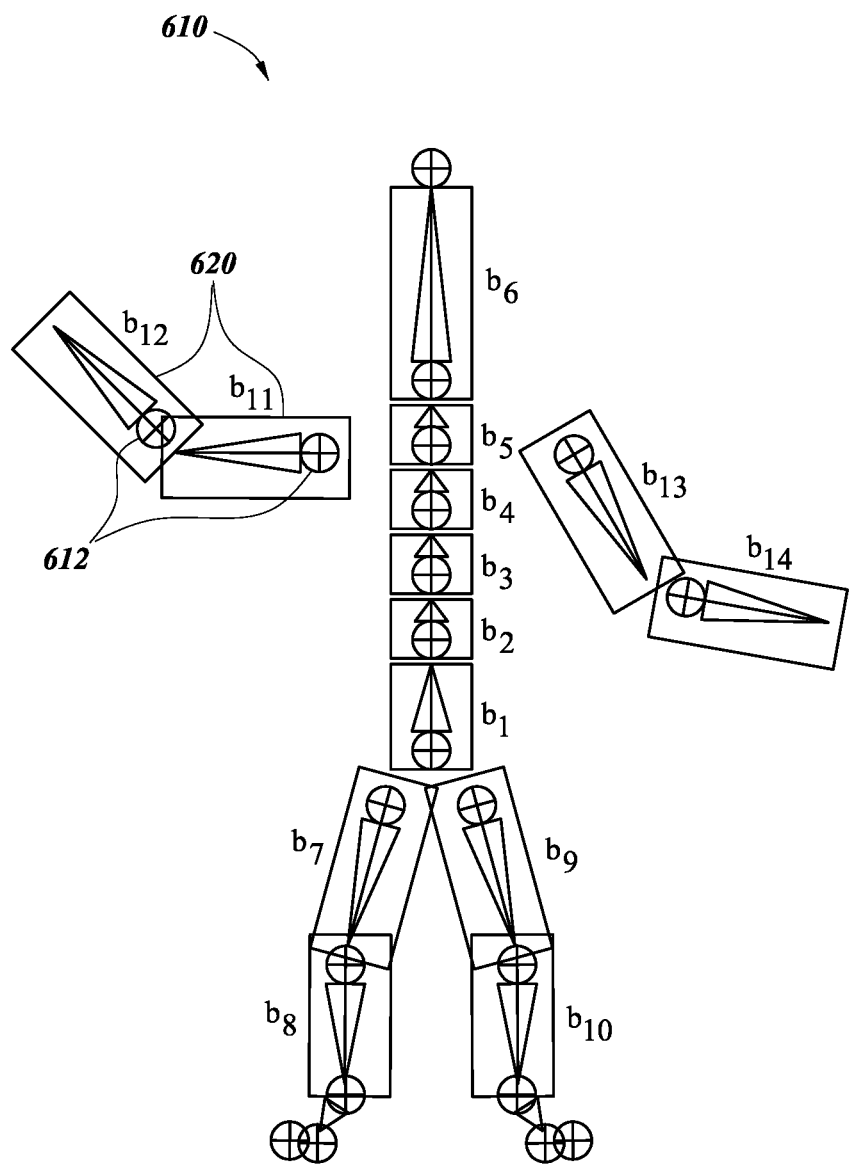
FIG. 6B illustrates an example of a skeletal system made up of multiple bones, with each bone having a corresponding cylinder.

After each point in the static unstructured point cloud has been assigned to a bone in the skeletal system model, at block 532 a cylinder is created for each bone in the skeletal system model. An example of this is illustrated in FIG. 6B. As discussed further below, the cylinder for each bone can be used to create a cylindrical grid of pixels onto which the cloud points corresponding to each bone can be mapped. This mapping can result in an unstructured point cloud representation of the cloud points corresponding to each bone.

FIG. 6B illustrates an example of a skeletal system 610 made up of multiple bones ($b_1, b_2, \ldots, b_N$), with each bone having a corresponding cylinder 620. As illustrated each bone $b_i$ can include a joint 612 at one end. The bones $b_i$ can generally be assembled with the non-joint end of one bone adjacent to the joint end of another bone so as to form the complete skeletal system 610. In the illustrated embodiment, bone $b_1$ is a root bone corresponding to the lower spine at the center of mass of the human avatar subject 600. Bones $b_2$ through $b_6$ correspond to the spine, neck, and head, while bones $b_{11}$ through $b_{14}$ correspond to the arms and bones $b_7$ through $b_{10}$ correspond to the legs. Although bones for the hands, fingers, feet, and toes are not shown (for clarity of illustration), they can also be included in the skeletal system 610.

As already mentioned with reference to block 532 of the method 500B shown in FIG. 5B, a cylinder 620 can be created for each bone $b_i$. In some embodiments, the axis of each cylinder 620 can be collinear with the orientation axis of the corresponding bone $b_i$ in the skeletal system model. Each cylinder 620 can be centered at or near the centroid of its corresponding bone and the length of each cylinder can typically be at least as long as the corresponding bone $b_i$, and possibly longer.

At block 533 of the method 500B shown in FIG. 5B, the cylinder 620 for each bone $b_i$ can be discretized into a cylindrical grid of pixels. An example of this is illustrated in FIG. 6C.

Figure 6C:
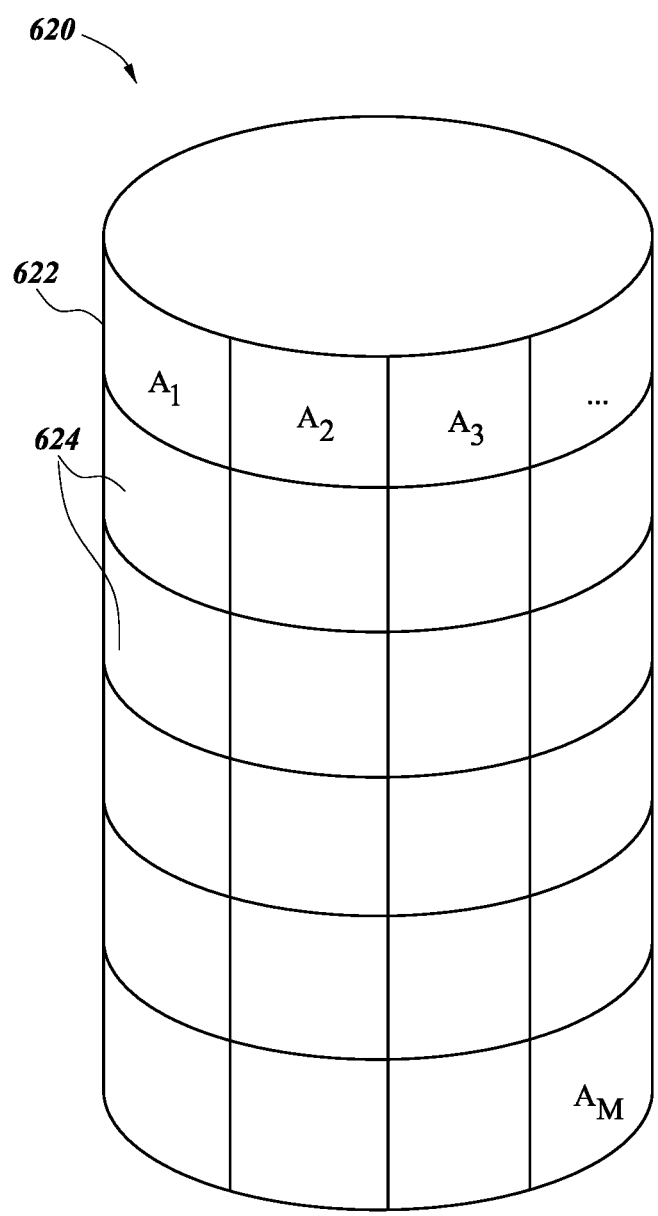
FIG. 6C illustrates an example cylindrical grid of pixels to which points in an unstructured point cloud can be mapped.

FIG. 6C illustrates an example cylindrical grid of pixels. The illustrated cylinder 620 has a surface 622 which is segmented into multiple pixels 624. In some embodiments, the pixels 624 can each be square or rectangular. The pixels 624 are numbered $A_1, A_2, \ldots A_M$ and each pixel 624 can have a set of coordinates to uniquely identify its position in the cylindrical grid.

The resolution of the cylindrical grid(s) can be determined by the number, density, and/or spacing of the discrete pixels 624. The resolution of the cylindrical grid of pixels for each bone $b_i$ can be used to adjust the degree of compression that is ultimately achieved. This can be understood from the fact that, when the dynamic unstructured point cloud is ultimately reconstructed using the structured point cloud representations (e.g., RGBD images) which are obtained by mapping the unstructured point cloud to the skeletal system model, each pixel 624 in each cylindrical grid can only yield one cloud point. Thus, cylindrical grids with higher resolution are typically capable of yielding higher reconstructed fidelity of the unstructured point cloud and a lower compression ratio. This is due to the fact that if the cylindrical grids have a higher resolution, then there is a greater probability that, each cloud point corresponding to a particular bone $b_i$ will be mapped to a different pixel 624 in the cylindrical grid. This means each cloud point can therefore be restored when the point cloud is reconstructed.

Conversely, cylindrical grids with lower resolution typically yield lower reconstructed model fidelity and a higher compression ratio. In the case of lower resolution, there is a greater probability that more than one cloud point corresponding to a particular bone $b_i$ will be mapped to the same pixel 624 of the cylindrical grid. When this occurs, only a single one of those points can be restored when the point cloud is reconstructed. When a single cloud point is reconstructed from multiple original cloud points, there is a reduction in the fidelity of the reconstructed point cloud. The resolution of the cylindrical grids can be flexibly chosen based upon the desired compression ratio and/or the desired fidelity of the reconstructed point cloud. In some embodiments, the resolution of each of the cylindrical grids is the same. In other embodiments, different cylindrical grids can have different resolutions.

Figure 6D:
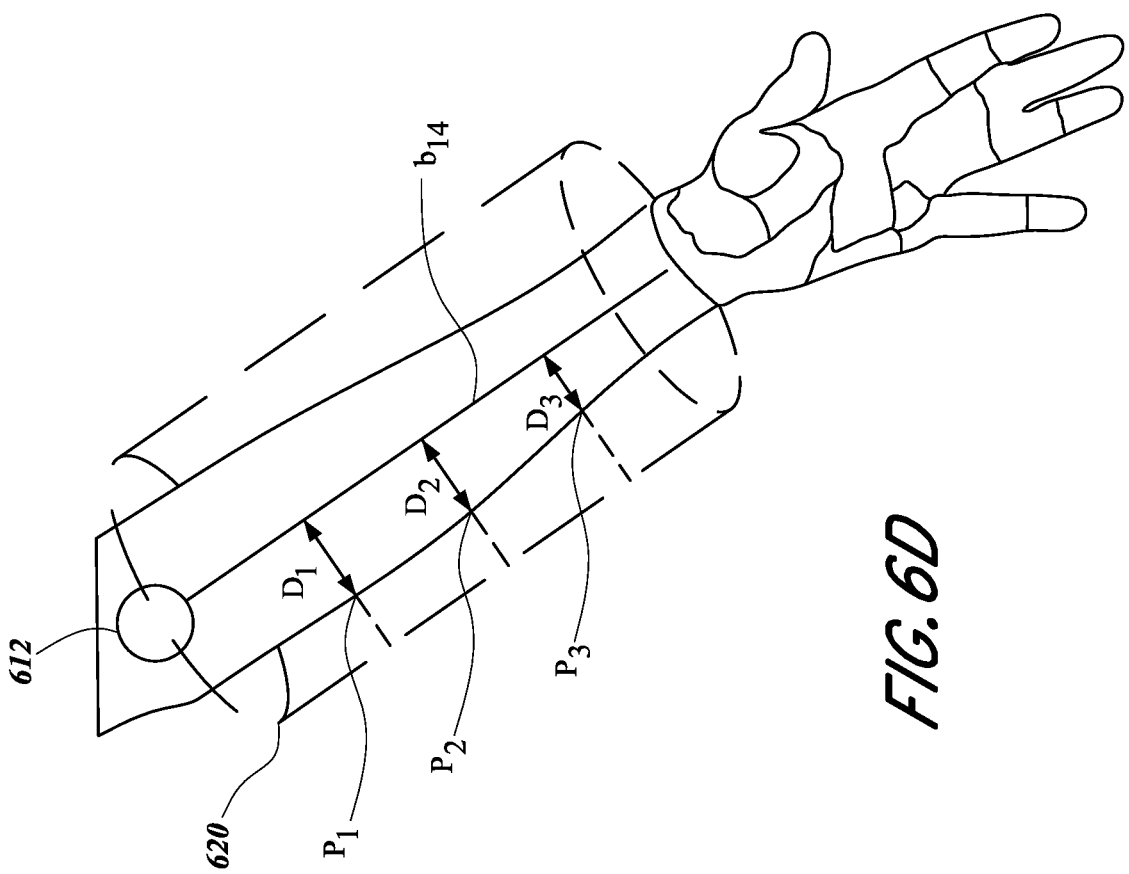
FIG. 6D is a diagram which illustrates the mapping of points in an unstructured point cloud to a cylindrical grid of pixels corresponding to a bone in a skeletal system model.

At block 534 of the method 500B shown in FIG. 5B, the points corresponding to each bone $b_i$ can each be radially projected into the cylindrical grid of pixels corresponding to that bone. FIG. 6D illustrates this procedure.

FIG. 6D is a diagram which illustrates the mapping of points in an unstructured point cloud to a cylindrical grid of pixels corresponding to a bone in a skeletal system model. The diagram shows one of the lower arm portions of the subject 600 from one frame of the dynamic unstructured point cloud. Three example points $P_1$, $P_2$, and $P_3$ in the unstructured point cloud are specifically labeled. The corresponding bone $b_{14}$ of the skeletal system model is shown superimposed upon the point cloud of the lower arm. The cylinder 620 corresponding to the bone $b_{14}$ is also shown. As illustrated, the axis of the cylinder 620 is collinear with the axis of the bone $b_{14}$. Although the cylinder 620 is illustrated as having a radius which is greater than the distance from its axis to any of the cloud points, this is not required; the cylinder 620 could alternatively have a radius which is smaller than the distance(s) from its axis to one or more of the cloud points.

As part of the procedure represented by block 534 of the method 500B shown in FIG. 5B, each of the points which were previously determined (at block 531) to correspond to the bone $b_{14}$ is radially projected toward the cylinder 620. For example, a line which passes through the cloud point in question, and which is perpendicular to the shared axis of the cylinder 620 and the bone $b_{14}$, can be determined. This is illustrated by the dashed lines in FIG. 6D which respectively extend from the points $P_1$, $P_2$, and $P_3$ toward the cylinder 620. Then, the specific pixel 624 where that line intersects with the surface 622 of the cylinder 620 can be calculated. That is the pixel 624 to which the cloud point in question is radially projected. This is referred to as a forward-projection.

When a cloud point is radially projected to a particular pixel in the cylindrical grid, the radial distance between that cloud point and the shared axis of the cylinder 620 and the bone $b_{14}$, along with any RGB values for that cloud point, can be recorded and associated with the coordinates of the pixel. With reference to the diagram in FIG. 6D, the distance $D_1$ can be recorded for the pixel to which $P_1$ is projected. Similarly, $D_2$ can be recorded for the pixel to which $P_2$ is projected, and $D_3$ can be recorded for the pixel to which $P_3$ is projected. In this way, a structured point cloud representation, such as an RGBD image, can be formed.

A cloud point can be restored by projecting the location of its corresponding pixel along a radial line from the pixel to the axis of the cylinder 620. The specific location of the restored cloud point along this radial line can be set based on the distance which was associated with the corresponding pixel during the forward-projection process. This is referred to as a back-projection.

The computer processor can also store metadata with each structured point cloud representation (e.g., RGBD image). The metadata can include, for example, an identification of the bone to which the structured point cloud representation corresponds, the location and orientation angle of that bone, and/or an identification of the frame of the dynamic unstructured point cloud to which the structured point cloud representation corresponds. This metadata can be used in the reconstruction of the dynamic unstructured point cloud, as discussed below with respect to FIG. 8.

The procedure illustrated by FIG. 6D can be repeated for each bone $b_i$ and its corresponding cylindrical grid of pixels. This can result in the production of multiple structured point cloud representations (e.g., RGBD images) for each frame of the dynamic unstructured point cloud that is being compressed—one unstructured point cloud representation for each bone in the skeletal system model.

This procedure for mapping the unstructured point cloud of the subject 600 to cylindrical grids of pixels using skeletal system models can be carried out for each of the static unstructured point clouds which collectively make up the dynamic unstructured point cloud that is being compressed. In some embodiments, this can result in N unstructured point cloud representations (e.g., RGBD images) of the subject 600 for each frame of the dynamic unstructured point cloud, where N is the number of bones in the subject's skeletal system.

At block 535 in FIG. 5B, in some embodiments, the computer processor can unwrap each cylindrical grid of pixels to create a flat unstructured point cloud representation (e.g., RGBD image). The computer processor can then combine the unstructured point cloud representations (e.g., RGBD images) for each frame of the dynamic unstructured point cloud into a single master image (e.g., a master RGBD image) per frame. This is illustrated in FIG. 7.

Figure 7:
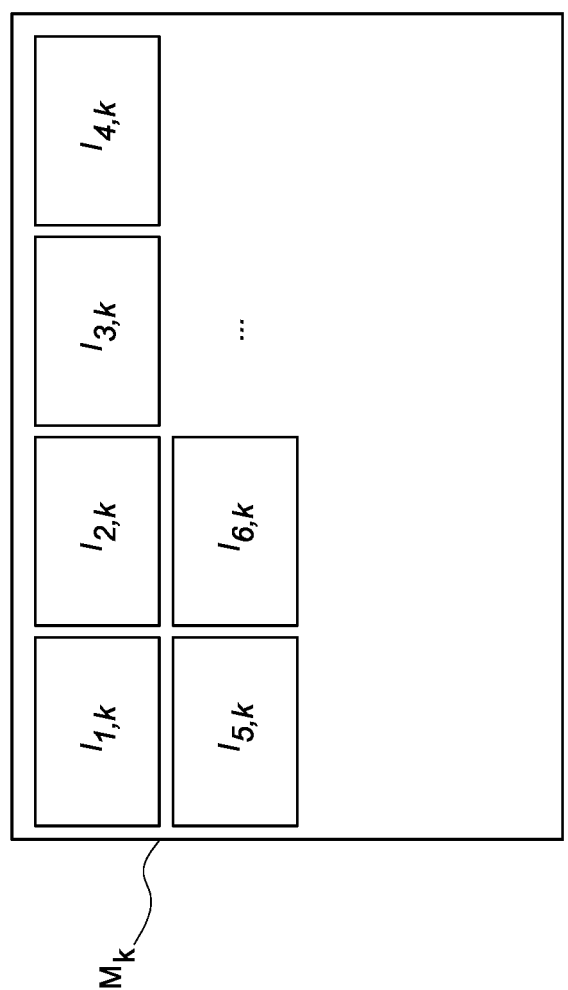
FIG. 7 illustrates an example of a master image which consists of multiple unwrapped cylindrical grids of pixels.

FIG. 7 illustrates an example of a master image $M_k$ which consists of multiple unwrapped cylindrical grids of pixels. Each of the unwrapped cylindrical grids of pixels is a structured point cloud representation (e.g., RGBD image). Let $I_{i,k}$ represent the entire set of structured point cloud representations (e.g., RGBD images) for the dynamic unstructured point cloud being compressed, where i is an index which represents the corresponding bone and k is an index which represents the corresponding frame of the dynamic unstructured point cloud. The master image $M_k$ for each frame of the dynamic unstructured point cloud is made up of a tiled pattern of the N structured point cloud representations (i.e., $I_{1,k}, I_{2,k}, \ldots, I_{N,k}$) for that frame, where N is the number of bones.

The master images $M_k$ can then be assembled into a sequence to form a master video (e.g., a master RGBD video). The master video $V=[M_1, M_2, M_3 \ldots M_k \ldots M_{NumFrames}]$, is a time sequence of the master images for the frames of the dynamic unstructured point cloud. This master video can be compressed using video compression algorithms, such as, H.264, H.265, QuickTime RLE, etc., according to block 540 in FIG. 5A.

In some embodiments, the structured point cloud representations for each frame (i.e., $I_{1,k}, I_{2,k}, \ldots, I_{N,k}$) are tiled into the master image $M_k$ such that the structured point cloud representation for each bone is consistently positioned in a similar location in the master images for all k. By tiling the structured point cloud representations (e.g., RGBD images) for the various bones together in the same way for each frame of the dynamic unstructured point cloud, temporal coherency can be preserved. This continuity in local image regions of the master image sequence can improve compressibility of the master image sequence.

In some embodiments, the dynamic unstructured point cloud can be compressed according to the following method:
1) Obtain a skeleton model for each frame in the dynamic unstructured point cloud sequence (a collection of $b_i$ bones, where there are N such bones;
2) Choose a resolution for the cylindrical grid of pixels for each bone;
3) Determine a layout for the unwrapped cylindrical grids of pixels to use in the master images;
4) For each frame of the dynamic unstructured point cloud;
   a) For each point p in the unstructured point cloud, create N point-bone tuples $[p,b_i]$;
   b) Sort all tuples in increasing order of distance from point p to bone $b_i$ and store in a list L;
   c) Consider the tuple $[p, b_i]$ with the smallest distance in L;
      i) Assign p to $b_i$ based on a radial projection into a given pixel of the cylindrical grid for a given bone;
      ii) Remove all tuples containing point p from L;
      iii) Repeat step c until all points are removed;
      iv) If necessary, adaptively increase bone resolution during step iii to ensure each point maps to a unique pixel in the cylindrical grid;
   d) Unravel and embed each cylindrical grid of pixels into a single master image using the layout from step 3;
5) Compress the sequence of master images from step 4 using a video compression standard.

Figure 8:
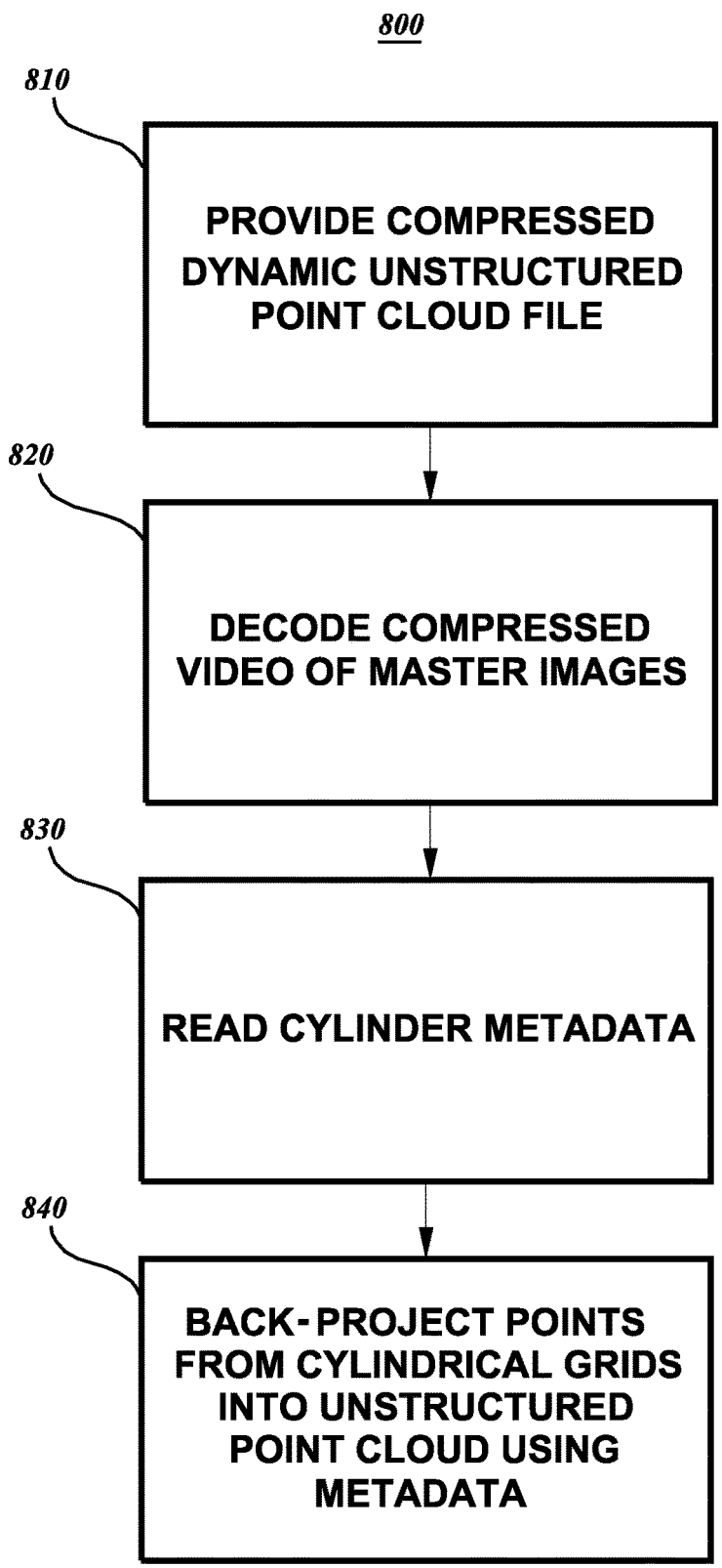
FIG. 8 is a flowchart of an example method for decoding a compressed dynamic unstructured point cloud into an uncompressed format.

FIG. 8 is a flowchart of an example method 800 for decoding a compressed dynamic unstructured point cloud into an uncompressed format. The method 800 can be used to reconstruct a dynamic unstructured point cloud which has been compressed according to the techniques described herein.

The method 800 begins at block 810, where the computer processor provides, or is provided with, a compressed dynamic unstructured point cloud file. At block 820, the computer processor decodes the compressed video of structured point cloud representations (e.g., the compressed master video, V) using the codec of whatever compression standard was used to compress the destructive images. This yields a sequence of uncompressed structured point cloud representation data. If the structured point cloud representations for each frame of the dynamic unstructured point cloud were assembled together into a master image, the master image can be unpacked into individual unwrapped cylindrical grids of pixels.

At block 830, the computer processor reads the metadata for each cylindrical grid of pixels from the file. As already discussed, this metadata can include, for example, an identification of the bone to which the structured point cloud representation corresponds, the location and orientation angle of that bone, and/or an identification of the frame of the dynamic unstructured point cloud to which the structured point cloud representation corresponds.

At block 840, the cylinder metadata can be used to reconstruct each frame of the dynamic unstructured point cloud from the corresponding destructive images. This can be done by back-projecting the pixels from structured point cloud representations (RGBD images) into the 3-D space of the point cloud. This metadata can be used to appropriately position and configure the cylindrical grids of pixels for performing the back-projections.

FIG. 9 is a table 900 which illustrates example data rates for the raw data produced by a volumetric capture system, as well as example data rates associated with different compression techniques. The example volumetric capture system has 60 cameras, with each camera capturing images at 30 frames per second and having 4096×3000 pixels with a bit depth of 8 bits. The volumetric capture system can output raw images for each camera, for each frame. The raw RGB image sequences captured by the cameras can have an approximate data rate of 177 Gbps. The raw RGB image sequences can be individually compressed if desired, for example, to transfer to a system that constructs a 3-D model of a subject based on the image data from the volumetric capture stage. If each of the RGB videos is individually compressed, the data rate can be reduced to approximately 3.1 Gbps, for a compression ratio of 1.75%. Meanwhile, construction of the 3-D model of the subject may yield a raw unstructured point cloud for each frame, and the raw dynamic unstructured point cloud computed from the RGB videos can have a data rate of approximately 1.2 Gbps. Finally, the dynamic unstructured point cloud can be compressed into an RGBD video, according to the techniques described herein, and can have a data rate of approximately 0.35 Gbps, which yields a compression ratio of 0.2% when compared to the raw data, or 11.3% when compared to the compressed RGB videos.

Example Embodiments

1. A method comprising: mapping a dynamic unstructured point cloud to a skeletal system of a subject to form one or more structured point cloud representations; forming one or more sequences of the structured point cloud representations; and compressing the one or more sequences of structured point cloud representations.

2. The method of Claim 1, wherein the dynamic unstructured point cloud comprises a sequence of multiple static unstructured point clouds.

3. The method of Claim 2, further comprising, for each static unstructured point cloud in the sequence, determining the orientation angle of each of a plurality of bones of the skeletal system of the subject.

4. The method of Claim 3, further comprising mapping each static unstructured point cloud in the sequence to the skeletal system of the subject to form the one or more structured point cloud representations.

5. The method of Claim 4, wherein mapping each static unstructured point cloud in the sequence to the skeletal system of the subject comprises: determining a distance from each cloud point to each of the plurality of bones in the skeletal system; and assigning each cloud point to the nearest bone.

6. The method of Claim 5, wherein mapping each static unstructured point cloud in the sequence to the skeletal system of the subject further comprises: creating a cylinder for each of the plurality of bones in the skeletal system of the subject, the cylinder having an axis that is collinear with an axis of the corresponding bone.

7. The method of Claim 6, wherein mapping each static unstructured point cloud in the sequence to the skeletal system of the subject further comprises: discretizing each cylinder into a cylindrical grid of pixels.

8. The method of Claim 7, wherein mapping each static unstructured point cloud in the sequence to the skeletal system of the subject further comprises: radially projecting each cloud point into a corresponding cylindrical grid of pixels; and recording a distance between each cloud point and an axis of the cylinder.

9. The method of Claim 2, further comprising, for each static unstructured point cloud in the sequence, assembling the one or more structured point cloud representations into a master image.

10. The method of Claim 9, further comprising forming a sequence of the respective master images for the static unstructured point clouds in the sequence and compressing the sequence of master images.

11. The method of Claim 9, further comprising specifying the positions of the structured point cloud representations in the master image based on bones in the skeletal system of the subject to which the structured point cloud representations respectively correspond.

12. The method of Claim 1, wherein the structured point cloud representations comprise red-green-blue-depth (RGBD) images.

13. The method of Claim 1, wherein compressing the one or more sequences of structured point cloud representations comprises using the H.264 standard, the H.265 standard, or the QuickTime RLS standard.

14. The method of Claim 1, further comprising decoding the compressed dynamic unstructured point cloud to an uncompressed format using metadata for the plurality of structured point cloud representations, the metadata for each of the structured point cloud representations comprising: an identification of a bone in the skeletal system of the subject to which the structured point cloud representation corresponds; the location or orientation angle of the bone; or an identification of a frame of the dynamic unstructured point cloud to which the structured point cloud representation corresponds.

15. The method of Claim 14, further comprising providing the decoded dynamic unstructured point cloud to a virtual reality, augmented reality, or mixed reality display system for viewing by a user.

16. A system comprising: a hardware computing device; and a memory configured to store a dynamic unstructured point cloud and instructions which, when executed by the hardware computing device, cause the hardware computing device to perform a method comprising: mapping a dynamic unstructured point cloud to a skeletal system of a subject to form one or more structured point cloud representations; forming one or more sequences of the structured point cloud representations; and compressing the one or more sequences of structured point cloud representations.

17. The system of Claim 16, wherein the dynamic unstructured point cloud comprises a sequence of multiple static unstructured point clouds.

18. The system of Claim 17, wherein the method performed by the hardware computing device further comprises, for each static unstructured point cloud in the sequence, determining the orientation angle of each of a plurality of bones of the skeletal system of the subject.

19. The system of Claim 18, wherein the method performed by the hardware computing device further comprises mapping each static unstructured point cloud in the sequence to the skeletal system of the subject to form the one or more structured point cloud representations.

20. The system of Claim 19, wherein mapping each static unstructured point cloud in the sequence to the skeletal system of the subject comprises: determining a distance from each cloud point to each of the plurality of bones in the skeletal system; and assigning each cloud point to the nearest bone.

21. The system of Claim 20, wherein mapping each static unstructured point cloud in the sequence to the skeletal system of the subject further comprises: creating a cylinder for each of the plurality of bones in the skeletal system of the subject, the cylinder having an axis that is collinear with an axis of the corresponding bone.

22. The system of Claim 21, wherein mapping each static unstructured point cloud in the sequence to the skeletal system of the subject further comprises: discretizing each cylinder into a cylindrical grid of pixels.

23. The system of Claim 22, wherein mapping each static unstructured point cloud in the sequence to the skeletal system of the subject further comprises: radially projecting each cloud point into a corresponding cylindrical grid of pixels; and recording a distance between each cloud point and an axis of the cylinder.

24. The system of Claim 17, wherein the method performed by the hardware computing device further comprises, for each static unstructured point cloud in the sequence, assembling the one or more structured point cloud representations into a master image.

25. The system of Claim 24, wherein the method performed by the hardware computing device further comprises forming a sequence of the respective master images for the static unstructured point clouds in the sequence and compressing the sequence of master images.

26. The system of Claim 24, wherein the method performed by the hardware computing device further comprises specifying the positions of the structured point cloud representations in the master image based on bones in the skeletal system of the subject to which the structured point cloud representations respectively correspond.

27. The system of Claim 16, wherein the structured point cloud representations comprise red-green-blue-depth (RGBD) images.

28. The system of Claim 16, wherein compressing the one or more sequences of structured point cloud representations comprises using the H.264 standard, the H.265 standard, or the QuickTime RLS standard.

29. The system of Claim 16, wherein the method performed by the hardware computing device further comprises decoding the compressed dynamic unstructured point cloud to an uncompressed format using metadata for the plurality of structured point cloud representations, the metadata for each of the structured point cloud representations comprising: an identification of a bone in the skeletal system of the subject to which the structured point cloud representation corresponds; the location or orientation angle of the bone; or an identification of a frame of the dynamic unstructured point cloud to which the structured point cloud representation corresponds.

30. The system of Claim 29, wherein the method performed by the hardware computing device further comprises providing the decoded dynamic unstructured point cloud to a virtual reality, augmented reality, or mixed reality display system for viewing by a user.

31. A non-transitory computer-readable medium which, when read by a hardware computing device, causes the hardware computing device to perform a method comprising: mapping a dynamic unstructured point cloud to a skeletal system of a subject to form one or more structured point cloud representations; forming one or more sequences of the structured point cloud representations; and compressing the one or more sequences of structured point cloud representations.

32. The computer-readable medium of Claim 31, wherein the dynamic unstructured point cloud comprises a sequence of multiple static unstructured point clouds.

33. The computer-readable medium of Claim 32, wherein the method performed by the hardware computing device further comprises, for each static unstructured point cloud in the sequence, determining the orientation angle of each of a plurality of bones of the skeletal system of the subject.

34. The computer-readable medium of Claim 33, wherein the method performed by the hardware computing device further comprises mapping each static unstructured point cloud in the sequence to the skeletal system of the subject to form the one or more structured point cloud representations.

35. The computer-readable medium of Claim 34, wherein mapping each static unstructured point cloud in the sequence to the skeletal system of the subject comprises: determining a distance from each cloud point to each of the plurality of bones in the skeletal system; and assigning each cloud point to the nearest bone.

36. The computer-readable medium of Claim 35, wherein mapping each static unstructured point cloud in the sequence to the skeletal system of the subject further comprises: creating a cylinder for each of the plurality of bones in the skeletal system of the subject, the cylinder having an axis that is collinear with an axis of the corresponding bone.

37. The computer-readable medium of Claim 36, wherein mapping each static unstructured point cloud in the sequence to the skeletal system of the subject further comprises: discretizing each cylinder into a cylindrical grid of pixels.

38. The computer-readable medium of Claim 37, wherein mapping each static unstructured point cloud in the sequence to the skeletal system of the subject further comprises: radially projecting each cloud point into a corresponding cylindrical grid of pixels; and recording a distance between each cloud point and an axis of the cylinder.

39. The computer-readable medium of Claim 32, wherein the method performed by the hardware computing device further comprises, for each static unstructured point cloud in the sequence, assembling the one or more structured point cloud representations into a master image.

40. The computer-readable medium of Claim 39, wherein the method performed by the hardware computing device further comprises forming a sequence of the respective master images for the static unstructured point clouds in the sequence and compressing the sequence of master images.

41. The computer-readable medium of Claim 39, wherein the method performed by the hardware computing device further comprises specifying the positions of the structured point cloud representations in the master image based on bones in the skeletal system of the subject to which the structured point cloud representations respectively correspond.

42. The computer-readable medium of Claim 31, wherein the structured point cloud representations comprise red-green-blue-depth (RGBD) images.

43. The computer-readable medium of Claim 31, wherein compressing the one or more sequences of structured point cloud representations comprises using the H.264 standard, the H.265 standard, or the QuickTime RLS standard.

44. The computer-readable medium of Claim 31, wherein the method performed by the hardware computing device further comprises decoding the compressed dynamic unstructured point cloud to an uncompressed format using metadata for the plurality of structured point cloud representations, the metadata for each of the structured point cloud representations comprising: an identification of a bone in the skeletal system of the subject to which the structured point cloud representation corresponds; the location or orientation angle of the bone; or an identification of a frame of the dynamic unstructured point cloud to which the structured point cloud representation corresponds.

45. The computer-readable medium of Claim 44, wherein the method performed by the hardware computing device further comprises providing the decoded dynamic unstructured point cloud to a virtual reality, augmented reality, or mixed reality display system for viewing by a user.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
   mapping a dynamic unstructured point cloud to a skeletal system of a subject to form one or more structured point cloud representations, wherein the dynamic unstructured point cloud comprises a sequence of multiple static unstructured point clouds;
   forming one or more sequences of the one or more structured point cloud representations;
   compressing the one or more sequences of the one or more structured point cloud representations;
   for each static unstructured point cloud in the sequence, determining an orientation angle of each of a plurality of bones of the skeletal system of the subject; and
   mapping each static unstructured point cloud in the sequence to the skeletal system of the subject to form the one or more structured point cloud representations,
   wherein the mapping each static unstructured point cloud in the sequence to the skeletal system of the subject includes:
      determining a distance from each cloud point to each of the plurality of bones in the skeletal system; and
      assigning each cloud point to a nearest bone.

2. The method of claim 1, wherein mapping each static unstructured point cloud in the sequence to the skeletal system of the subject further comprises:
   creating a cylinder for each of the plurality of bones in the skeletal system of the subject, the cylinder having an axis that is collinear with an axis of the corresponding bone.

3. The method of claim 2, wherein mapping each static unstructured point cloud in the sequence to the skeletal system of the subject further comprises:
   discretizing each cylinder into a cylindrical grid of pixels.

4. The method of claim 3, wherein mapping each static unstructured point cloud in the sequence to the skeletal system of the subject further comprises:
   radially projecting each cloud point into a corresponding cylindrical grid of pixels; and
   recording a distance between each cloud point and an axis of the cylinder.

5. The method of claim 1, further comprising, for each static unstructured point cloud in the sequence, assembling the one or more structured point cloud representations into a master image.

6. The method of claim 5, further comprising forming a sequence of master images for the static unstructured point clouds in the sequence and compressing the sequence of master images.

7. The method of claim 5, further comprising specifying positions of the structured point cloud representations in the master image based on bones in the skeletal system of the subject to which the structured point cloud representations respectively correspond.

8. The method of claim 1, wherein the structured point cloud representations comprise red-green-blue-depth (RGBD) images.

9. The method of claim 1, wherein compressing the one or more sequences of structured point cloud representations comprises using an H.264 standard, an H.265 standard, or a QuickTime RLS standard.

10. The method of claim 1, further comprising decoding the dynamic unstructured point cloud to an uncompressed format using metadata for the one or more structured point cloud representations, the metadata for each of the one or more structured point cloud representations comprising:
    an identification of a bone in the skeletal system of the subject to which the structured point cloud representation corresponds;
    a location or orientation angle of the bone; or
    an identification of a frame of the dynamic unstructured point cloud to which the one or more structured point cloud representation corresponds.

11. The method of claim 10, further comprising providing the decoded dynamic unstructured point cloud to a virtual reality, augmented reality, or mixed reality display system for viewing by a user.

12. A system comprising:
    a hardware computing device; and
    a memory configured to store a dynamic unstructured point cloud including a sequence of static unstructured point clouds and instructions which, when executed by the hardware computing device, cause the hardware computing device to perform a method comprising:

mapping the dynamic unstructured point cloud to a skeletal system of a subject to form one or more structured point cloud representations;

forming one or more sequences of the one or more structured point cloud representations; and compressing the one or more sequences of the one or more structured point cloud representations;

for each static unstructured point cloud in the sequence, determining an orientation angle of each of a plurality of bones of the skeletal system of the subject; and mapping each static unstructured point cloud in the sequence to the skeletal system of the subject to form the one or more structured point cloud representations, wherein mapping each static unstructured point cloud in the sequence to the skeletal system of the subject includes:

determining a distance from each cloud point to each of the plurality of bones in the skeletal system; and assigning each cloud point to the nearest bone.

13. The system of claim 12, wherein mapping each static unstructured point cloud in the sequence to the skeletal system of the subject further comprises:

creating a cylinder for each of the plurality of bones in the skeletal system of the subject, the cylinder having an axis that is collinear with an axis of the corresponding bone.

14. The system of claim 13, wherein mapping each static unstructured point cloud in the sequence to the skeletal system of the subject further comprises:

discretizing each cylinder into a cylindrical grid of pixels.

15. The system of claim 14, wherein mapping each static unstructured point cloud in the sequence to the skeletal system of the subject further comprises:

radially projecting each cloud point into a corresponding cylindrical grid of pixels; and recording a distance between each cloud point and an axis of the cylinder.

16. The system of claim 12, wherein the method performed by the hardware computing device further comprises, for each static unstructured point cloud in the sequence, assembling the one or more structured point cloud representations into a master image.

17. The system of claim 16, wherein the method performed by the hardware computing device further comprises forming a sequence of master images for the static unstructured point clouds in the sequence and compressing the sequence of master images.

18. The system of claim 16, wherein the method performed by the hardware computing device further comprises specifying positions of the structured point cloud representations in the master image based on bones in the skeletal system of the subject to which the structured point cloud representations respectively correspond.

19. The system of claim 12, wherein the structured point cloud representations comprise red-green-blue-depth (RGBD) images.

20. The system of claim 12, wherein compressing the one or more sequences of structured point cloud representations comprises using an H.264 standard, an H.265 standard, or a QuickTime RLS standard.

21. The system of claim 12, wherein the method performed by the hardware computing device further comprises decoding the dynamic unstructured point cloud to an uncompressed format using metadata for the one or more structured point cloud representations, the metadata for each of the structured point cloud representations comprising:

an identification of a bone in the skeletal system of the subject to which the structured point cloud representation corresponds;

a location or orientation angle of the bone; or an identification of a frame of the dynamic unstructured point cloud to which the structured point cloud representation corresponds.

22. The system of claim 21, wherein the method performed by the hardware computing device further comprises providing the decoded dynamic unstructured point cloud to a virtual reality, augmented reality, or mixed reality display system for viewing by a user.

23. A non-transitory computer-readable medium which, when read by a hardware computing device, causes the hardware computing device to perform a method comprising:

mapping a dynamic unstructured point cloud to a skeletal system of a subject to form one or more structured point cloud representations, wherein the dynamic unstructured point cloud comprises a sequence of static unstructured point clouds;

forming one or more sequences of the one or more structured point cloud representations;

compressing the one or more sequences of the one or more structured point cloud representations; for each static unstructured point cloud in the sequence, determining an orientation angle of each of a plurality of bones of the skeletal system of the subject; and mapping each static unstructured point cloud in the sequence to the skeletal system of the subject to form the one or more structured point cloud representations, wherein the mapping each static unstructured point cloud in the sequence to the skeletal system of the subject includes:

determining a distance from each cloud point to each of the plurality of bones in the skeletal system; and assigning each cloud point to a nearest bone.

* * * * *